United States Patent [19]

Kawabata et al.

[11] Patent Number: 4,490,522

[45] Date of Patent: Dec. 25, 1984

[54] PROCESS FOR PRODUCING POLYPHENYLENE SULFIDE

[75] Inventors: Juheiji Kawabata, Sakai; Toshio Inoue, Izumiohtsu; Toshinori Sugie, Takaishi; Fumihiro Kobata, Izumi, all of Japan

[73] Assignee: Dainippon Ink & Chemicals, Inc., Tokyo, Japan

[21] Appl. No.: 519,234

[22] Filed: Aug. 2, 1983

[30] Foreign Application Priority Data

Aug. 4, 1982 [JP] Japan ................................. 57-136090
Oct. 21, 1982 [JP] Japan ................................. 57-183626
Dec. 14, 1982 [JP] Japan ................................. 57-217765

[51] Int. Cl.³ .............................................. C08G 75/14
[52] U.S. Cl. ..................................... 528/388; 528/86; 528/222; 528/224
[58] Field of Search ................... 528/388, 222, 224, 86

[56] References Cited

U.S. PATENT DOCUMENTS 3,354,129 11/1967 Edmonds et al. .................... 528/388
3,919,177 11/1975 Campbell ............................ 528/388

Primary Examiner—Harold D. Anderson
Attorney, Agent, or Firm—Sherman & Shalloway

[57] ABSTRACT

A process for production of polyphenylene sulfide which comprises reacting an alkali metal sulfide compound with a polyhalogenated aromatic compound in an organic polar solvent in the presence of an oxyalkylene compound.

16 Claims, No Drawings

PROCESS FOR PRODUCING POLYPHENYLENE SULFIDE

This invention relates to a process for production of polyphenylene sulfide (to be abbreviated as PPS). More specifically, this invention relates to a novel process for production of PPS which has a low content of impurities composed of electrolytic components.

PPS is widely used as engineering plastics, films and fibers having excellent heat resistance and chemical resistance obtained by melt-molding in accordance with a injection molding method, an extrusion molding method, etc. General processes for production of PPS have already been known For example, U.S. Pat. No. 3,354,129 discloses a process which comprises reacting p-dichlorobenzene with sodium sulfide in an organic amide solvent such as N-methylpyrrolidone. Furthermore, U.S. Pat. No. 3,919,177 discloses an improved polymerization process for obtaining PPS having a high degree of polymerization, in which an alkali metal carboxylate is added as a polymerization promoter On the other hand, when such PPS is used as films, fibers or various electrical or electronic component parts, inorganic electrolytic impurities such as sodium chloride contained in the polymer should desirably be minimized in order to retain the inherent moldability and electrical insulating property of PPS. For example, when a monoaxially or biaxially stretched film is prepared from PPS having a high viscosity and containing inorganic electrolytic impurities, the stretching characteristics and transparency of the film are much inferior to those of a film prepared from PPS having a high purity. Furthermore, when PPS is used as a coating or sealing material for electronic component parts such as integrated circuits, transistors or condensers, the electrodes or wirings of these electronic component parts may undergo corrosion and breakage, and the leakage current will increase undesirably. To remove this defect, it is necessary to use PPS whose electrolytic impurities such as sodium chloride have been removed as much as possible In the aforesaid manufacturing processes, sodium chloride is simultaneously formed and deposited as a by-product in much the same amount as the resulting PPS, and consequently PPS obtained by ordinary treatments contains a considerable amount of sodium chloride. Molded articles of such PPS have the defect of being much inferior in moldability and electrical properties to those prepared from PPS having a low sodium chloride content.

It is an object of this invention to remedy the aforesaid defect of conventional processes for producing PPS.

The present inventors have extensively worked in order to achieve this object, and found that PPS scarcely containing electrolytic components such as sodium chloride can be obtained by reacting an alkali metal sulfide compound with a polyhalogenated aromatic compound under heat in an organic polar solvent such as N-methylpyrrolidone in the presence of an oxyalkylene compound.

According to this invention, there is provided a process for producing PPS which comprises reacting an alkali metal sulfide compound with a polyhalogenated aromatic compound in an organic polar solvent in the presence of an oxyalkylene compound, preferably the oxyalkylene compounds to be described hereinbelow, and as required, in the further presence of a polymerization promoter such as a metal salt of an organic acid.

According to the process of this invention, the amount of electrolytic components in PPS can be reduced to a level equal to, or below, that attained by a conventional method of decreasing impurities by repeatedly treating PPS powder obtained by washing after polymerization, in boiling deionized water for a long period of time, or a conventional method of decreasing impurities by heating the aforesaid PPS powder again in an organic amide solvent in the presence of an alkali metal carboxylate or a lithium halide. In other words, since according to the process of this invention, PPS having a very low content of electrolytic components can be obtained in the polymerization step, a step of purifying PPS recovered from the polymerization step as in the conventional processes can be omitted, and by simply subjecting the recovered PPS to an ordinary washing with hot water, PPS having a very low content of impurities can be produced at low cost within short periods of time.

The polyhalogenated aromatic compound, a monomer used in the process of this invention, is a halogenated aromatic compound having at least two, preferably 2 to 4, halogen atoms. Specific examples include p-dichlorobenzene, m-dichlorobenzene, o-dichlorobenzene, trichlorobenzene, tetrachlorobenzene, dichloronaphthalene, trichloronaphthalene, dibromobenzene, tribromobenzene, dibromonaphthalene, iodobenzene, triiodobenzene, dichlorodiphenylsulfone, dibromodiphenylsulfone, dichlorobenzophenone, dibromobenzophenone, dichlorodiphenyl ether, dibromodiphenyl ether, dichlorodiphenyl sulfide, dibromodiphenyl sulfide, dichlorobiphenyl, dibromobiphenyl, and mixtures of these. Usually, a dihalogenated aromatic compound is used as the monomer. As required, in order to increase the viscosity of the polymer by providing a branched structure, a small amount of a polyhalogenated aromatic compound having at least 3 halogen substituents per molecule may be copolymerized with it.

Examples of the alkali metal sulfide compound used in the process of this invention include lithium sulfide, sodium sulfide, potassium sulfide, rubidium sulfide, cesium sulfide, and mixtures of these. The alkali metal sulfide may be used in the form of a hydrate and/or an aqueous mixture, or in an anhydrous form. The alkali metal sulfide may be derived from an alkali metal hydrosulfide and an alkali metal hydroxide. A small amount of an alkali metal hydroxide may be added in order to react it with an alkali metal hydrosulfide or an alkali metal thiosulfate present in trace in the alkali metal sulfide compound.

The organic polar solvent used in the process of this invention is substantially liquid at the reaction temperature and pressure employed. Examples of preferred organic polar solvent include amides such as formamide, acetamide, N-methylformamide, N,N-dimethylformamide, N,N-dimethylacetamide, 2-pyrrolidone, N-methyl-2-pyrrolidone, N-ethyl-2-pyrrolidone, epsilon-caprolactam, N-methyl-epsilon-caprolactam, hexamethylphosphoramide, tetramethylurea, and 1,3-dimethyl-2-imidazolidinone; urea and lactams; sulfones such as sulfolane and dimethylsulfolane; nitriles such as benzonitrile; ketones such as methyl phenyl ketone; and mixtures of these. Among these solvents, aprotic organic polar solvents such as amides, lactams and sulfones are preferred.

Preferred oxyalkylene compounds for use in the method of this invention include compounds having an HLB value of 1 to 19 and represented by the general formula $$RO(R_1O)_n(R_2O)_mH \quad [A]$$

wherein R represents a hydrogen atom, an alkyl group having 1 to 40 carbon atoms, or an aryl group having 6 to 50 carbon atoms (provided that an oxyalkylene group is not ring-substituted at the aryl group), $R_1$ and $R_2$ represent an alkylene group having 2 to 4 carbon atoms, n and m are 0 or an integer of 1 or more, preferably 2 to 40, provided that the sum of n and m is at least 1, preferably 5 to 60, and compounds of the following general formula

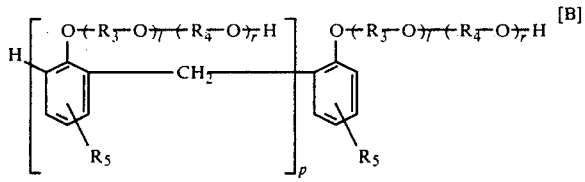

wherein $R_3$ and $R_4$ represent an alkylene group having 2 to 4 carbon atoms, $R_5$ represents a hydrogen atom, an alkyl group having 1 to 30 carbon atoms, or an aryl group, l and r are 0 or an integer of up to 90, preferably 3 to 20, provided that the sum of l and r is an integer of 1 to 90, preferably 4 to 30, and p is an integer of 2 to 50.

In formula [A], R represents a hydrogen atom, an alkyl group having 1 to 40 carbon atoms, preferably 8 to 30 carbon atoms, or an aryl group having 6 to 50 carbon atoms, and may have such an atom as oxygen, sulfur, fluorine, chlorine or bromine. Preferred examples of R are hydrogen; linear alkyl groups such as octyl, decyl, lauryl, tridecyl, tetradecyl, pentadecyl, hexadecyl, octadecyl, and decosyl groups; branched alkyl groups such as 1-methylheptyl, 2-ethylhexyl, 1-methyl-4-ethylhexyl, and 1-methyl-4-ethyloctyl groups; alkylaryl groups such as ethylphenyl, butylphenyl hexylphenyl, dodecylhenyl, nonylphenyl, isooctylphenyl, tetrapropylenephenyl and vinylphenyl groups; and alcohol residues of sorbitan alkyl esters.

The compounds of formula [A] preferably have an HLB value of 1 to 19, more preferably 3 to 16. The HLB value, as referred to herein, stands for a hydrophile lyophile balance which is a general measure of the emulsifying action of nonionic surface-active agents. For oxyalkylene adducts of monohydric alcohols, the HLB value can be calculated from the equation HLB=E/5 wherein E is the weight percent of oxyalkylene. Compounds of formula [A] having an HLB value of more than 19 have low affinity for PPS and poor penetrability into PPS. Hence, their action of separating and removing electrolytic components is not sufficient, and these compounds are outside the scope of the present invention Examples of especially preferred compounds [A] are polyoxyethylene monooctyl ether, polyoxyethylene monolauryl ether, polyoxyethylene monooctyl phenyl ether, polyoxyethylene polyoxypropylene monooctylphenyl ether, polyoxyethylene monolauryl ester, polyoxypropylene monooctyl ether, polyoxypropylene monolauryl ether, polyoxypropylene monooctylphenyl ether, polyoxypropylene mononylphenyl ether, polyoxypropylene monolauryl ester, and mixtures of at least two of these.

The oxyalkylene compounds may also include crown ether compounds such as 15-crown-5, 18-crown-6, dibenzo-18-crown-6, dicyclohexyl-18-crown-6, dibenzo-24-crown-8 and dicyclohexyl-24-crown-8.

Examples of the oxyalkylene compounds expressed by general formula [B] are those in which $R_3$ and $R_4$ are

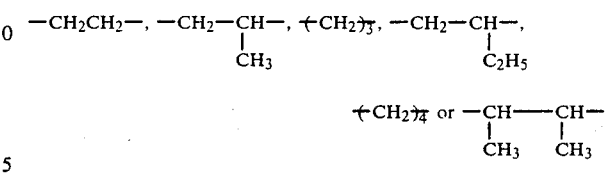

and $R_5$ is a hydrogen atom, an alkyl group such as a methyl, ethyl, butyl, octyl, nonyl, dodecyl, cetyl, 10-methylheptyl, 2-ethylhexyl, or 1-methyl-4-ethyloctyl group, an alkylaryl group such as an ethylphenyl, dodecylphenyl or nonylphenyl group, or an aryl group such as a phenyl or naphthyl group. Specific examples include polyoxyethylenephenyl formaldehyde condensate, polyoxyethylenemethylphenyl formaldehyde condensate, polyoxyethylenenonylphenyl formaldehyde condensate, polyoxyethylenecetylphenyl formaldehyde condensate, polyoxypropylene methyl phenyl aldehyde condensate, polyoxypropylenenonylphenyl aldehyde condensate, polyoxybutylenenonylphenyl aldehyde condensate, oxyethylenephenol formaldehyde condensate and oxyethylenenonylphenol formaldehyde condensate.

In the process of this invention, the amount of the alkali metal sulfide compound is in the range of 0.8 to 1.5 moles, preferably 0.9 to 1.1 moles, per mole of the polyhalogenated aromatic compound. The amount of the organic polar solvent used is usually 2.5 to 20 moles, preferably 3 to 10 moles, per mole of the alkali metal sulfide compound.

In the practice of the process of this invention, at least one polymerization promoter selected from the group consisting of metal salts of organic acids, lithium halides, alkali metal carbonates and alkali metal salts of inorganic phosphoric acid may be added to the polymerization system.

Examples of preferred metal salts of organic acids are alkali metal, alkaline earth metal or zinc salts of organic carboxylic acids or organic sulfonic acids having a hydrocarbon group with 1 to 30 carbon atoms, and alkali metal salts of organic phosphoric acids having a hydrocarbon group with 1 to 24 carbon atoms.

The organic carboxylic acid salts and organic sulfonic acid salts preferably have 1 to 4 carboxylic acid groups and/or sulfonic acid groups in the molecule and 1 to 15 carbon atoms in the hydrocarbon group. Examples of the metal component are Li, Na, K, Rb, Cs, Be, Mg, Ca, Sr, Ba and Zn.

The organic phosphate salts preferably have 1 to 2 phosphoric acid groups in the molecule and 1 to 15 carbon atoms in the hydrocarbon group. Examples of the metal component of he phosphate salts are Li, Na, K, Rb and Cs.

Typical examples of the organic carboxylates include lithium acetate, sodium acetate, potassium acetate, calcium acetate, barium acetate, zinc acetate, lithium propionate, sodium propionate, lithium valerate, sodium valerate, zinc valerate, sodium laurate, sodium myristate, sodium palmitate, dilithium succinate, disodium succinate, calcium succinate, zinc succinate, sodium malonate, dilithium glutarate, disodium glutarate, disodium adipate, dipotassium adipate, disodium azelate, dipotassium azelate, disodium sebacate, lithium benzoate, sodium benzoate, potassium benzoate, calcium benzoate, barium benzoate, magnesium benzoate, strontium benzoate, zinc benzoate, sodium methylbenzoate, potassium ethylbenzoate, sodium naphthalenecarboxylate, calcium naphthalenecarboxylate, dilithium phthalate, disodium phthalate, dipotassium phthalate, calcium phthalate, disodium isophthalate, dipotassium isophthalate, calcium isophthalate, dilithium terephthalate, disodium terephthalate, dipotassium terephthalate, calcium terephthalate, trilithium trimellitate, trisodium trimellitate, tetralithium pyromellitate, and tetrasodium pyromellitate.

Typical examples of the organic sulfonic acid salts include sodium benzenesulfonate, potassium benzenesulfonate, magnesium benzenesulfonate, calcium benzenesulfonate, lithium p-toluenesulfonate, sodium p-toluenesulfonate, calcium p-toluenesulfonate, barium p-toluenesulfonate, sodium dodecylbenzenesulfonate, potassium dodecylbenzenesulfonate, sodium alpha-naphthalenesulfonate, potassium alpha-naphthalenesulfonate, disodium naphthalenedisulfonate, dipotassium naphthalenedisulfonate and calcium naphthalenedisulfonate. Preferred organic sulfonic acid metal salts are metal salts of aromatic mono- or di-sulfonic acids having 6 to 15 carbon atoms.

Typical examples of the alkali metal salts of organic phosphoric acids are Li, Na, K, Rb and Cs salts of methylphosphoric acid, ethylphosphoric acid, propylphosphoric acid, butylphosphoric acid, heptylphosphoric acid, hexylphosphoric acid, nonylphosphoric acid, decylphosphoric acid, undecylphosphoric acid, dodecylphosphoric acid, phenylphosphoric acid, p-toluenephosphoric acid and p-tert.-butylphenylphosphoric acid.

In the process of this invention, there can also be used a lithium halide such as lithium chloride or lithium bromide, an alkali metal carbonate such as lithiuum carbonate, sodium carbonate or potassium carbonate, an alkali metal salt of an inorganic phosphoric acid such as lithium phosphate, sodium phosphate or potassium phosphate.

The amount of the oxyalkylene compound used in the invention is usually 0.01 to 30% by weight, preferably 0.5 to 20% by weight, based on the weight of the halogenated aromatic compound as a monomer. The amount of at least one polymerization promoter selected from metal salts of organic acids, lithium halides, alkali metal carbonates and alkali metal salts of inorganic phosphoric acid is preferably 0.05 to 2 moles per mole of the alkali metal sulfide compound In a preferred embodiment of the process of this invention, the desired PPS is obtained by adding an alkali metal sulfide, an alkali metal salt of an organic carboxylic acid, and an alkali metal hydroxide to an organic polar solvent preferably in an inert gaseous atmosphere and at room temperature to 130° C., driving off most of water in the reaction system under atmospheric pressure at a temperature of 150° to 230° C., preferably 170° to 210° C., with stirring, cooling the reaction mixture, then adding the polyhalogenated aromatic compound and the oxyalkylene compound, performing polymerization reaction under an elevated pressure at a temperature of 150° to 290° C., preferably 210° to 280° C., for 1 to 10 hours, repeating a procedure of filtering, boiling in hot water and washing the reaction mixture in a customary manner several times, finally washing it with acetone, and then drying the product.

The resulting PPS can retain good electrical insulating property inherent to PPS because it has a high purity with scarcely any impurities composed of electrolytic components such as sodium chloride. PPS obtained by the process of this invention in the further presence of the aforesaid polymerization promoter has a high melt viscosity without thickening by a hot cross-linking treatment, and therefore, can be molded not only by injection molding but also by extrusion molding or blow molding. Hence, this PPS is very useful for molding into films, fibers and various electrical and electronic component parts. Since such PPS scarcely contains electrolytic components which corrode the electrodes or wirings of electronic component parts, it is very useful as a coating or sealing material for various electronic component parts such as semiconductors, integral circuits, condensers, resistors and coils.

The following examples illustrate the process of this invention.

In these examples, the logarithmic viscosity values were calculated on the basis of relative viscosity values measured at 206° C. for a solution of 0.4 g of polymer in 100 ml of alpha-chloronaphthalene.

The sodium ion content of PPS in these examples was measured as follows:

PPS powder (150 to 500 mg) was taken into a 50 ml Kjeldahl flask, and 10 ml of deionized water and 5 ml of sulfuric acid adapted for precision analysis were added. The flask was shaken well, and then zeolite was put into it to perform thermal decomposition. The mixture became blackish brown as the decomposition proceeded. When evolution of gas was no longer observed, the mixture was cooled and 2 or 3 drops of perchloric aicd were added to perform thermal decomposition further Until the decomposed mixture became a colorless transparent solution, the above procedure was repeated to decompose the sample completely. After the decomposition, the solution was cooled. The contents of the flask were washed into a 50 ml measuring flask and diluted to an indicator line to prepare a test solution. The flame light intensity at 589 nm of the test solution was measured by an atomic absorptiometer using an atmosphere of nitrogen suboxide gas and an acetylene flame. The result was checked against a calibration curve which was prepared in advance using a standard solution of sodium chloride. The sodium ion content of PPS was thus determined.

EXAMPLE 1

A 1-liter autoclave was charged with 350 g of N-methylpyrrolidone, 104.8 g (0.80 mole) of sodium sulfide 2.7-hydrate and 0.4 g (0.01 mole) of sodium hydroxide, and in an atmosphere of nitrogen, the mixture was heated to 200° C. over the course of about 2 hours to distill 21 ml of water. The reaction mixture was cooled to 150° C., and then 117.6 g (0.80 mole) of p-dichlorobenzene, 80 g of N-methylpyrrolidone and 11.7 g of ethylene glycol monononylphenyl ether (average molecular weight: 264 and HLB: 3.3) were added. The mixture was reacted at 230° C. for 1 hour and then at 260° C. for 3 hours. The pressure of the inside of the autoclave at the end of polymerization was 6.5 kg/cm². The reactor was cooled, and the contents were filtered, washed three times with boiling hot water and then twice with acetone, and then dried at 120° C. to give 81.2 g (yield 94%) of PPS as a pale grayish brown powder. The polymer had a logarithmic viscosity of 0.18 and a sodium ion content of 24 ppm.

COMPARATIVE EXAMPLE 1

By performing the same polymerization as in Example 1 except that ethylene glycol monononylphenyl ether (HLB: 3.3) was not added, 75.2 g (yield 87%) of a pale grayish brown powdery polymer was obtained. The polymer had a logarithmic viscosity of 0.15 and a sodium ion content of 1,250 ppm.

EXAMPLES 2 to 7

Example 1 was repeated except that each of the oxyalkylene compounds indicated in Table 1 was used instead of the ethylene glycol monononylphenyl ether (HLB: 3.3) used in Example 1. The results are shown in Table 1.

TABLE 1

| | Oxyalkylene compound of general formula [A] | | | | Properties and yield of PPS produced | | |
|---|---|---|---|---|---|---|---|
| Example | Compound used | Average molecular weight | HLB value | Amount (g) | $Na^+$ content (ppm) | Yield (%) | Logarithmic viscosity (dl/g) |
| 2 | Polyoxyethylene monononyl phenyl ether | 361 | 7.8 | 7.0 | 20 | 92 | 0.17 |
| 3 | Polyoxyethylene monononyl phenyl ether | 704 | 13.7 | 7.0 | 130 | 90 | 0.16 |
| 4 | Ethylene glycol monostearyl ether | 314 | 2.8 | 7.0 | 33 | 93 | 0.16 |
| 5 | Polyoxyethylene monooctyl phenyl ether | 371 | 8.9 | 21.0 | 21 | 89 | 0.18 |
| 6 | Polyoxyethylene monooctyl phenyl ether | 597 | 13.1 | 21.0 | 74 | 89 | 0.16 |
| 7 | Polyoxyethylene monocetyl ether | 538 | 11.0 | 7.0 | 54 | 90 | 0.17 |

EXAMPLE 8

A 1-liter autoclave was charged with 350 g of N-methylpyrrolidone, 104.8 g (0.80 mole) of sodium sulfide 2.7-hydrate, 115.2 g (0.80 mole) of sodium benzoate and 0.4 g (0.01 mole) of sodium hydroxide, and in an atmosphere of nitrogen the mixture was heated with stirring to 200° C. over the course of about 2 hours to distill 21 ml of water. The mixture was cooled to 150° C., and 117.6 g (0.80 mole) of p-dichlorobenzene, 80 g of N-methylpyrrolidone and 11.7 g of polyoxyethylene monooctylphenyl ether (average molecular weight: 646 and HLB: 13.6) were added. The mixture was reacted at 230° C. for 1 hour and then at 260° C. for 3 hours. At the end of the polymerization, the pressure of the inside of the autoclave was 6.7 kg/cm². The reactor was cooled, and the contents were filtered, washed three times with boiling hot water and twice with acetone, and dried at 120° C. to give 81.3 g (yield 94%) of PPS as pale grayish brown granules. The polymer had a logarithmic viscosity of 0.34 and a sodium ion content of 27 ppm.

EXAMPLE 9

Polymerization was carried out under the same conditions as in Example 8 except that 117 g (0.80 mole) of p-dichlorobenzene and 0.44 g (0.3 mole% based on p-dichlorobenzene) of 1,2,4-trichlorobenzene were used as the polyhalogenated aromatic compound, and 81.6 g (0.80 mole) of lithium acetate dihydrate was used instead of sodium benzoate. There was obtained 76.8 g (yield 89%) of PPS as pale grayish brown granules. The polymer had a logarithmic viscosity of 0.42 and a sodium ion content of 21 ppm.

COMPARATIVE EXAMPLE 2

Polymerization was carried out in the same way as in Example 1 except that polyoxyethylene monoctylphenyl ether (average molecular weight: 646) was not added. There was obtained 78.5 g (yield 91%) of PPS as pale grayish brown granules. The polymer had a logarithmic viscosity of 0.29 and a sodium ion content of 480 ppm.

EXAMPLES 10 to 18

Example 8 was repeated except that 117 g (0.80 mole) of p-dichlorobenzene and 0.44 g (0.3 mole % based on p-dichlorobenzene) of 1,2,4-trichlorobenzene were used as the polyhalogenated aromatic compound, and each of the combinations of oxyalkylene compounds and metal salts of organic acids indicated in Table 2 was used instead of the combination of polyoxyethylene monooctylphenyl ether (average molecular weight 646: and HLB: 13.6) and sodium benzoate. The results are shown in Table 2.

TABLE 2

| | Oxyalkylene compound of general formula [A] | | | | Metal salt of organic acid | | PPS produced | | |
|---|---|---|---|---|---|---|---|---|---|
| Example | Compound used | Average molecular weight | HLB value | Amount (g) | Compound used | Amount (g) | $Na^+$ content (ppm) | Yield (%) | Logarithmic viscosity (dl/g) |
| 10 | Polyoxyethylene monononyl phenyl ether | 352 | 7.5 | 7.0 | Sodium benzoate | 115.2 | 23 | 92 | 0.44 |
| 11 | Polyoxyethylene monononyl phenyl ether | 1100 | 16.0 | 7.0 | Sodium benzoate | 115.2 | 22 | 94 | 0.45 |
| 12 | Polyoxyethylene monononyl phenyl ether | 1100 | 16.0 | 21.0 | Sodium benzoate | 115.2 | 21 | 92 | 0.44 |
| 13 | Polyoxyethylene monolauryl ether | 538 | 13.1 | 7.0 | Sodium benzoate | 115.2 | 35 | 91 | 0.42 |
| 14 | Polyoxyethylene monostearyl ether | 1150 | 15.3 | 7.0 | Sodium benzoate | 115.2 | 38 | 93 | 0.46 |
| 15 | Polyoxyethylene monooctyl phenyl ether | 646 | 13.6 | 7.0 | Lithium acetate | 52.8 | 21 | 89 | 0.42 |
| 16 | Polyoxyethylene monooctyl | 646 | 13.6 | 7.0 | Sodium | 65.6 | 28 | 90 | 0.32 |

TABLE 2-continued

| | Oxyalkylene compound of general formula [A] | | | Metal salt of organic acid | | PPS produced | | |
|---|---|---|---|---|---|---|---|---|
| Example | Compound used | Average molecular weight | HLB value | Amount (g) | Compound used | Amount (g) | $Na^+$ content (ppm) | Yield (%) | Logarithmic viscosity (dl/g) |
| 17 | phenyl ether Polyoxypropylene monooctyl phenyl ether | 786 | 14.8 | 7.0 | acetate Sodium benzoate | 115.2 | 26 | 91 | 0.43 |
| 18 | Polyoxyethylene polyoxypropylene copolymer monooctyl phenyl ether (ethylene/propylene mole ratio = 1:1) | 806 | 14.2 | 7.0 | Sodium benzoate | 115.2 | 22 | 92 | 0.43 |

EXAMPLE 19

A 1-liter autoclave was charged with 350 g of N-methylpyrrolidone, 104.8 g (0.80 mole) of sodium sulfide 2.7-hydrate and 0.4 g (0.01 mole) of sodium hydroxide, and in an atmosphere of nitrogen, the mixture was heated to 200° C. over the course of about 2 hours to distill 21 ml of water. The reaction mixture was cooled to 150° C., and then 117.6 g (0.80 mole) of p-dichlorobenzene, 80 g of N-methylpyrrolidone, and 8.6 g of a polyoxyethylene nonylphenyl formaldehyde condensate of general formula [B] in which $R_3$ is —$CH_2CH_2$—, $R_5$ is —$C_9H_{19}$, p is 3, l is 8 and r is zero were added. The mixture was reacted at 230° C. for 1 hour and then at 26° C. for 3 hours. At the end of polymerization, the pressure of the inside of the autoclave was 6.4 kg/cm². The reactor was cooled, and the contents were filtered, washed three times with boiling hot water and twice with acetone, and dried at 120° C. to give 79.5 g (yield 92%) of PPS as a pale grayish brown powder. The polymer had a logarithmic viscosity of 0.17 and a sodium content of 21 ppm.

EXAMPLES 20 to 36

Example 19 was repeated except that each of the oxyalkylene compounds and optionally the alkali metal salts of organic acids indicated in Table 3 were used instead of the polyoxyethylene monooctylphenyl ether. The results are shown in Table 3.

TABLE 3

| | Oxyalkylene compound of general formula [B] | | | | | | Metal salt of organic acid | | PPS produced | | |
|---|---|---|---|---|---|---|---|---|---|---|---|
| | Compound used | | | | | | | | $Na^+$ | Yield | Logarithmic viscosity |
| Example | $R_3$ | $R_4$ | $R_5$ | p | l | r | Amount (g) | Compound used | Amount (g) | content (ppm) | (%) | (dl/g) |
| 20 | —$CH_2CH_2$— | — | —$C_9H_{19}$ | 3 | 8 | 0 | 17.2 | — | — | 17 | 91 | 0.17 |
| 21 | " | — | " | " | " | 0 | 1.7 | — | — | 120 | 89 | 0.15 |
| 22 | " | — | " | " | 16 | 0 | 8.6 | — | — | 18 | 93 | 0.16 |
| 23 | " | — | " | " | 32 | 0 | " | — | — | 42 | 91 | 0.16 |
| 24 | " | — | " | " | 8 | 0 | " | Lithium acetate | 52.8 | 18 | 95 | 0.36 |
| 25 | " | — | " | 6 | 16 | 0 | " | Sodium acetate | 65.6 | 26 | 92 | 0.29 |
| 26 | " | — | " | " | 0 | 0 | " | Sodium benzoate | 115.2 | 40 | 94 | 0.32 |
| 27 | " | — | —$CH_3$ | 3 | 8 | 0 | " | Sodium benzoate | 115.2 | 35 | 93 | 0.35 |
| 28 | " | — | —$C_{16}H_{33}$ | " | " | 0 | " | — | — | 51 | 90 | 0.16 |
| 29 | —$CH_2CH$— $|$ $CH_3$ | — | —$C_9H_{19}$ | " | " | 0 | " | — | — | 32 | 92 | 0.17 |
| 30 | —$CH_2CH_2$— | — | " | " | " | 0 | 17.2 | Lithium chloride | 33.9 | 31 | 95 | 0.36 |
| 31 | " | — | " | " | " | 0 | " | Sodium fluoride | 33.6 | 34 | 91 | 0.22 |
| 32 | " | — | " | " | " | 0 | " | Sodium phthalate | 84.0 | 19 | 95 | 0.30 |
| 33 | —$CH_2CH_2$— | — | —$C_9H_{19}$ | 3 | 8 | 0 | 17.2 | Sodium p-toluenesulfonate | 155.2 | 76 | 90 | 0.23 |
| 34 | " | — | " | " | " | 0 | " | Trisodium phosphate | 131.2 | 65 | 91 | 0.18 |
| 35 | " | — | " | " | " | 0 | " | Calcium acetate | 140.8 | 82 | 92 | 0.21 |
| 36 | " | —$CH_2CH$— $|$ $CH_3$ | " | " | " | 4 | " | Sodium benzoate | 115.2 | 20 | 92 | 0.32 |

What is claimed is:

1. A process for producing polyphenylene sulfide powder or granules, which comprises reacting an alkali metal sulfide compound with a polyhalogenated phenylene compound in an organic polar solvent in contact with an oxyalkylene compound, and washing the product polyphenylene sulfide with hot water, whereby polyphenylene sulfide powder or granules, having a low content of impurities composed of electrolytic components is obtained.

2. The process of claim 1 wherein the oxyalkylene compound is a compound having a hydrophile-lipophile-balance value of 1 to 19 and is represented by the general formula

RO—(R₁—O)ₙ—(R₂—O)ₘ—H wherein R represents a hydrogen atom, an alkyl group having 1 to 40 carbon atoms or an aryl group having 6 to 50 carbon atoms, each of $R_1$ and $R_2$ represents an alkylene group having 2 to 4 carbon atoms, n and m are zero or an integer of at least 1, and the sum of n and m is at least 1.

3. The process of claim 1 wherein the oxyalkylene compound is a compound represented by the general formula

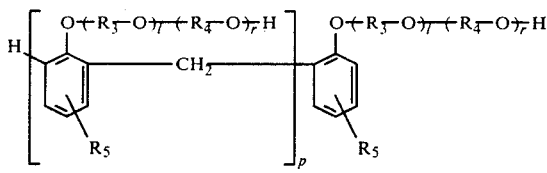

wherein $R_3$ and $R_4$ represent an alkylene group having 2 to 4 carbon atoms, $R_5$ represents a hydrogen atom, an alkyl group having 1 to 30 carbon atoms or an aryl group, l and r are an integer of 0 to 90, the sum of l and r is an integer of 1 to 90, and p is an integer of 2 to 50.

4. The process of claim 1 wherein the alkali metal sulfide compound is lithium sulfide, sodium sulfide, potassium sulfide, rubidium sulfide, cesium sulfide or a mixture thereof.

5. The process of claim 1 wherein the polyhalogenated phenylene compound has at least two halogen atoms directly bonded to the aromatic ring.

6. A process for producing polyphenylene sulfide, powder or granules, which comprises reacting an alkali metal sulfide compound with a polyhalogenated phenylene compound in an organic polar solvent in contact with (a) an oxyalkylene compound and (b) at least one polymerization promoting salt selected from the group consisting of metal salts of organic acids, lithium halides, alkali metal carbonates, and alkali metal salts of inorganic phosphoric acid, and washing the product polyphenylene sulfide with hot water, whereby polyphenylene sulfide powder or granules having a low content of impurities composed of electrolytic components is obtained.

7. The process of claim 6 wherein the oxyalkylene compound is a compound having a hydrophile-lipophile-balance value of 1 to 19 and is represented by the general formula

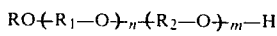

RO$\{$R$_1$—O$\}_n$$\{$R$_2$—O$\}_m$—H wherein R represents a hydrogen atom, an alkyl group having 1 to 40 carbon atoms or an aryl group having 6 to 50 carbon atoms, each of $R_1$ and $R_2$ represents an alkylene group having 2 to 4 carbon atoms, n and m are zero or an integer of at least 1, and the sum of n and m is at least 1.

8. The process of claim 6 wherein the oxyalkylene compound is a compound represented by the general formula

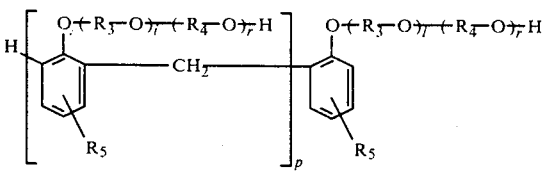

wherein $R_3$ and $R_4$ represent an alkylene group having 2 to 4 carbon atoms, $R_5$ represents a hydrogen atom, an alkyl group having 1 to 30 carbon atoms or an aryl group, l and r are an integer of 0 to 90, the sum of l and r is an integer of 1 to 90, and p is an integer of 2 to 50.

9. The process of claim 6 wherein the metal salts of organic acids are alkali metal, alkaline earth metal or zinc salts of organic carboxylic acids or organic sulfonic acids having a hydrocarbon group with 1 to 30 carbon atoms, or alkali metal salts of organic phosphoric acid having a hydrocarbon group with 1 to 24 carbon atoms.

10. The process of claim 1 or 6 wherein the mole ratio of the alkali metal sulfide compound to the polyhalogenated phenylene compound is 0.8–1.5:1.

11. The process of claim 1 or 6 wherein the amount of the oxyalkylene compound is 0.01 to 30% by weight based on the weight of the polyhalogenated phenylene ompound.

12. The process of claim 6 wherein the amount of the salt (b) is 0.05 to 2 moles per mole of the alkali metal sulfide compound.

13. The process of claim 1 or 2 which comprises reacting the alkali metal sulfide powder or granules compound and the polyhalogenated phenylene compound at a temperature of 150° to 290° C. for a period of 1 to 10 hours.

14. The process of claim 2 or 7 wherein the oxyalkylene compound has a hydrophile-lipophile value of from 3 to 16 and is a compound selected from the group consisting of polyoxyethylene monooctyl ether, polyoxyethylene monolauryl ether, polyoxyethylene monooctyl phenyl ether, polyoxyethylene polyoxpropylene monooctylphenyl ether, polyoxyethylene monolauryl ester, polyoxypropylene monooctyl ether, polyoxypropylene monolauryl ether, polyoxypropylene monooctylphenyl ether, polyoxypropylene mononon ylphenyl ether, polyoxypropylene monolauryl ether, and mixtures thereof.

15. The process of claim 3 or 8 wherein the oxyalkylene compound is selected from the group consisting of polyoxyethylenephenyl formaldehyde condensate, polyoxyethylenemethylphenyl formaldehyde condensate, polyoxyethylenenonylphenyl formaldehyde condensate, polyoxyethylenecetrylphenyl formaldehyde condensate, polyoxypropylene methyl phenyl aldehyde condensate, polyoxyproplenenonylphenyl aldehyde condensate, polyoxybutylenenonylphenyl aldehyde condensate, oxyethylenephenol formaldehyde condensate, and oxyethylenenonylphenol formaldehyde condensate.

16. A process for producing polyphenylene sulfide having a low content of impurities composed of electrolytic components which comprises adding an alkali metal sulfide hydrate, an alkali metal salt of an organic carboxylic acid as a polymerization promoter, and an alkali metal hydroxide to an organic polar solvent in an inert gaseous atmosphere at a temperature of from room temperature to 130° C., heating the resulting mixture at a temperature of 150° to 230° C. to evaporate most of the water in the mixture, cooling the resulting mixture, adding a polyhalogenated phenylene compound and an oxyalkylene compound to the mixture and maintaining the mixture at a temperature of from 150° to 290° C. for from 1 to 10 hours to produce polyphenylene sulfide, filtering the reaction mixture to recover the polyphenylene sulfide, washing the recovered polyphenylene sulfide first in boiling water and then in acetone, and drying the polyphenylene sulfide product.

* * * * *

UNITED STATES PATENT AND TRADEMARK OFFICE
CERTIFICATE OF CORRECTION

PATENT NO. : 4,490,522
DATED : December 25, 1984
INVENTOR(S) : KAWABATA, ET AL.

It is certified that error appears in the above-identified patent and that said Letters Patent is hereby corrected as shown below:

Claim 11, line 4, delete "ompound", insert --compound--.
Claim 13, line 2, delete "powder or granules".
Claim 15, line 6, delete "polyoxyethylenecetrylphenyl", insert --polyoxyethylenecetylphenyl--.
Claim 16, line 1, after "sulfide", insert --powder or granules--.

Signed and Sealed this

Twenty-eighth Day of May 1985

[SEAL]

Attest:

DONALD J. QUIGG

Attesting Officer

Acting Commissioner of Patents and Trademarks